T. A. GANNOE.
CENTRIFUGAL GUN.
APPLICATION FILED NOV. 7, 1917.

1,309,129.

Patented July 8, 1919.
5 SHEETS—SHEET 3.

Inventor:
Thomas A. Gannoe,
by Spear, Middleton, Donaldson & Spear
Atty's.

T. A. GANNOE.
CENTRIFUGAL GUN.
APPLICATION FILED NOV. 7, 1917.

1,309,129.

Patented July 8, 1919.
5 SHEETS—SHEET 4.

Inventor:
Thomas A. Gannoe,
Attys.

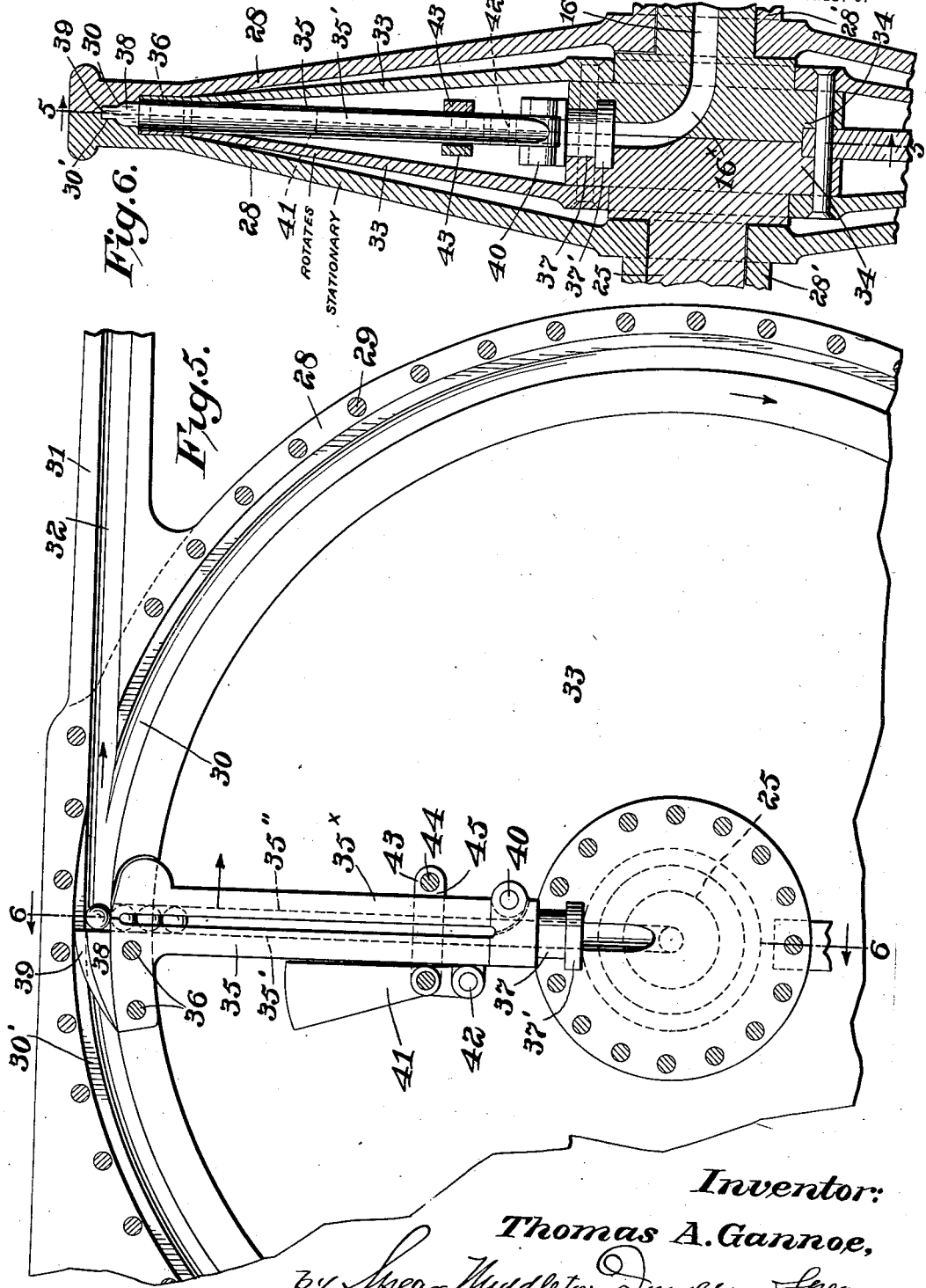

UNITED STATES PATENT OFFICE.

THOMAS A. GANNOE, OF WARREN, PENNSYLVANIA, ASSIGNOR TO GANNOE MANUFACTURING COMPANY, A CORPORATION OF WEST VIRGINIA.

CENTRIFUGAL GUN.

1,309,129.  Specification of Letters Patent.  Patented July 8, 1919.

Application filed November 7, 1917. Serial No. 200,838.

*To all whom it may concern:*

Be it known that I, THOMAS A. GANNOE, a citizen of the United States, and resident of Warren, Pennsylvania, have invented certain new and useful Improvements in Centrifugal Guns, of which the following is a specification.

The invention consists in the features and combination and arrangement of parts hereinafter described, and particularly pointed out in the claims.

In the accompanying drawings,

Fig. 5 is a detail sectional view on the line 5—5 of Fig. 6.

Fig. 6 is a detail sectional view on the line 6—6 of Fig. 5.

Figure 1:
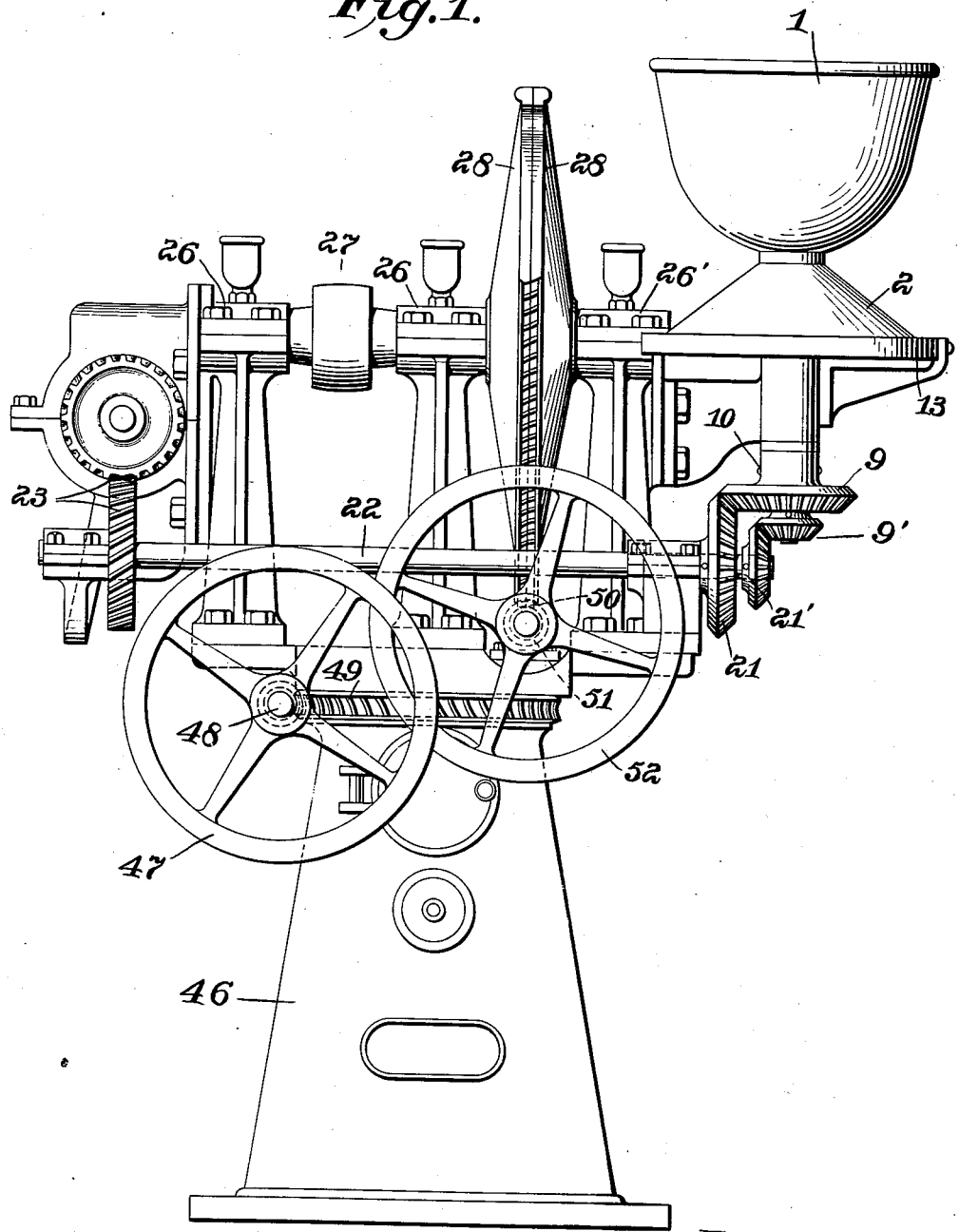
Figure 1 is an elevation of the gun.
Figure 2:
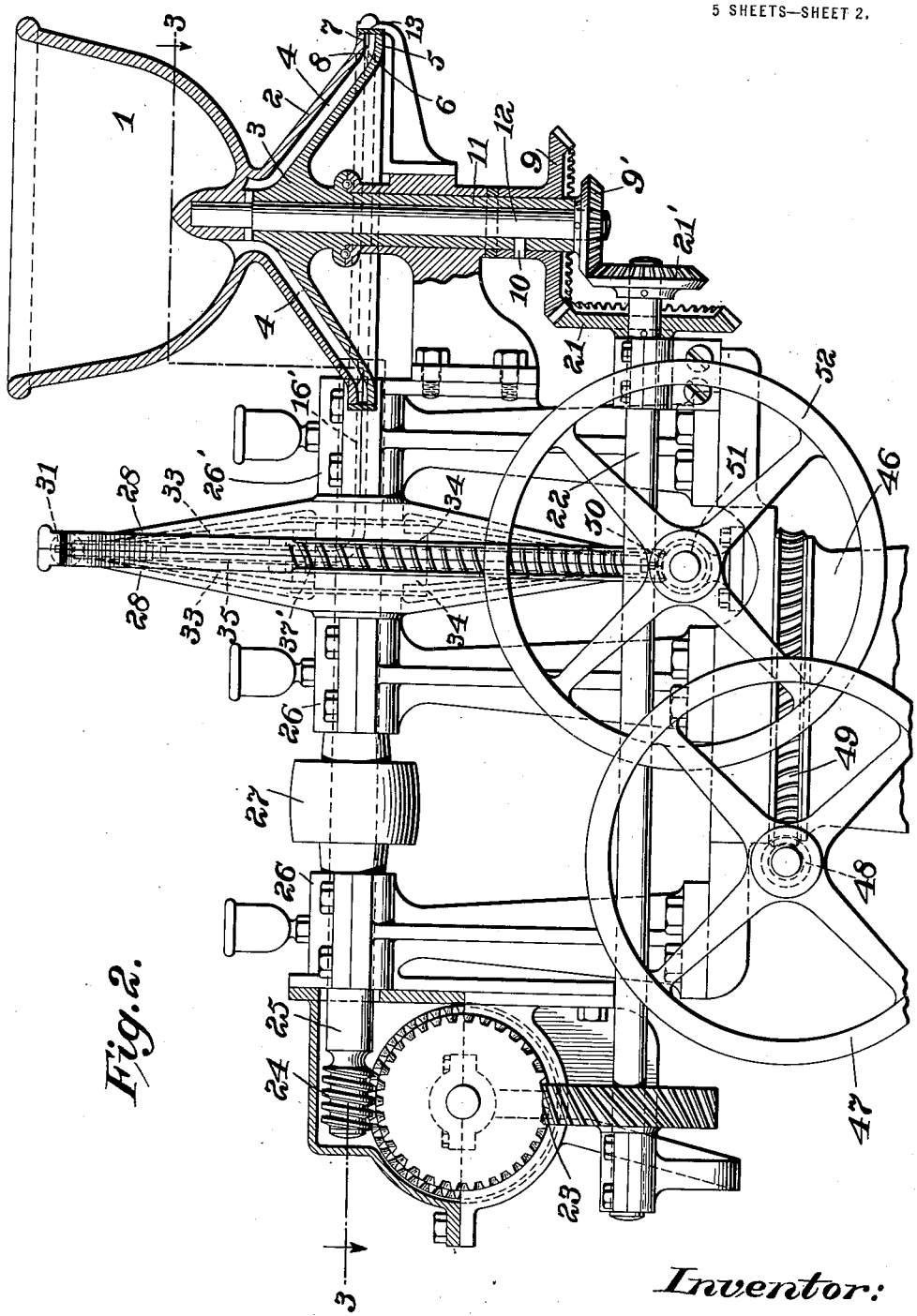
Fig. 2 is a detail view looking in the same direction as in Fig. 1 but with parts in section.

The bullets to be thrown or projected from the gun are placed in the reservoir 1 having a conical or flaring extension 2, within which a feeding cone 3 is arranged, space being provided at 4 between the cone and the flaring shell 2 for the downward passage of the bullets from the hopper 1 to the outer edge of the said conical feeder. This conical feeder at its lower edge has a horizontal flange 5 provided with radial ribs 6, recessed at 7 on their upper sides. The ribs extend only along the horizontal flanged portion 5 and at their inner ends the said ribs are of a height to extend from the flange 5 to the inner or underside of the flaring shell 2, as indicated at 8. The conical feeder is rotated by a gear 9 pinned at 10 to the hollow shaft or sleeve 11 of the conical feeder, this sleeve or hollow shaft 11 turning on an inner shaft 12, on the top of which the hopper 1 with its flaring bottom shell 2 is mounted.

Figure 3:
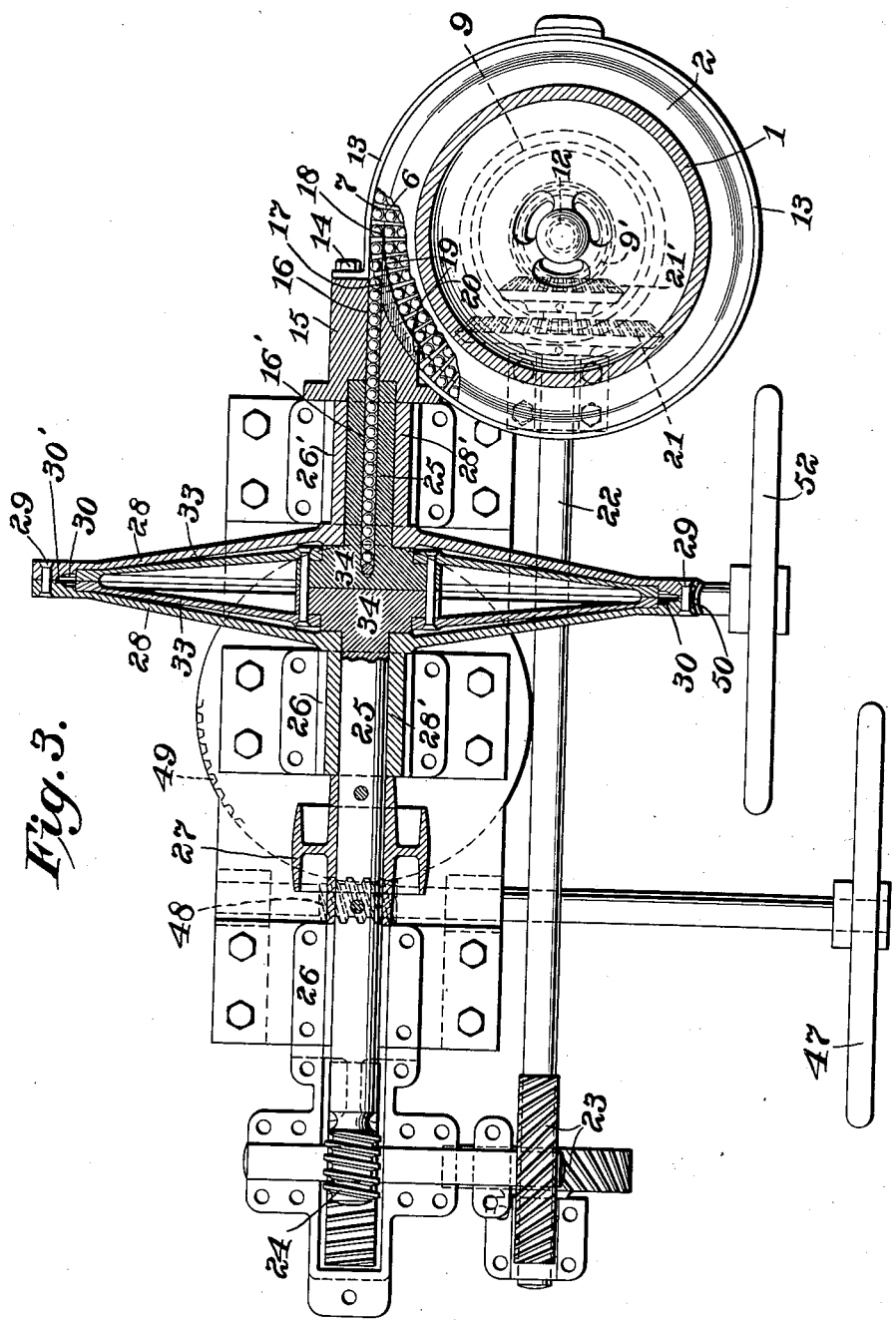
Fig. 3 is a plan view with parts in section.

The space between the flaring shell 2 and the conical feeder 3 is closed at the edge of these parts by a rib 13, which is bolted to the frame at 14, as shown in Fig. 3. The frame 15 as shown in Fig. 3 adjacent which the conical feeder rotates is provided with a channel 16 for the passage of the bullets from the feeder to the projecting or throwing device and in order to direct the bullets into this channel 16 I provide a directing or deflecting member 17, which is fixed in position relative to the frame 15 and the conical feeder, and lies in the channel or notch 7 formed in the upper edge of the radial ribs 6, before mentioned.

This deflector terminates at 18 in a needle point so that the outermost bullet lying between the ribs 6 will be separated from the other bullets lying between the same pair of ribs and will be forced by the following rib along the channel 16.

The second bullet lying in the same radial channel with the one just entering the conduit or channel 16 will pass along the inner side or edge 19 of the deflector or directing member until the end 20 of said member is reached, when the weight of the balls in the space 4 will cause this ball just mentioned to move outwardly in its radial channel between the ribs 5 to thereby assume its outermost position against the flange or rib 13, so that when this ball in a revolution of the feeder comes around to the needle point 18, it will be separated from the other balls in the same radial channel therewith and will be directed along the straight channel 16 to the centrifugal projecting device.

The hopper 1 may be rotated to effect an agitation of the mass of balls therein through a gear 9', the said gears 9, and 9' being rotated by gears 21, 21' on a shaft 22, which is driven through gearing 23 from a worm 24 on the shaft 25 mounted in suitable bearings 26 of the supporting frame, said shaft being driven from any suitable motor, the pulley 27 being representative of any suitable driving connection. This shaft 25 is axially in line with the channel 16 before mentioned and is provided with an axial channel of the same diameter as the channel 16, as shown at 16', Fig. 3, and it receives the balls and directs them to the centrifugal projecting device. This projecting device comprises an outer casing composed of sides 28 in the form of conical plates or disks suitably mounted in the frame plates or disks suitably mounted in the frame and preferably in the bearings 26, 26', for which purpose the conical plates have hollow journals 28' and these receive the shafts 25. The conical plates 28 are secured together at their outer edges by rivets or other suitable means at 29. They have a channel between them at 30 adapted to receive the balls and they also have extensions 31, which form the barrel of the gun, the bore of which is shown at 32, Fig. 5, this bore extending tangentially in relation to the channel 30. Within this casing 28 the rotary member of the projecting device works, this member consisting of the side plates 33, also of conical form, secured by rivets or the like to the hub portion 34 of the shaft 25, it being noted that the shaft 25 is formed in sections and each section has one of the hub portions 34 formed therewith.

The channel 16' in the shaft 25 has an extension 16× curving from the axial portion of the channel and merging into a radial portion and thereby the balls are directed into engagement with the rotary projecting member consisting of an arm 35 bolted or otherwise secured between the plates 33 at 36 and held at their inner end by its head 37 between the hub sections 34, said hub sections being suitably socketed to receive said head, which it will be noticed is flanged at 37'.

The ball projecting arm 35 has a finger 38, Fig. 5, extending into the channel 30 and the finger 38 also has a reduced portion 39 which runs in a reduced annular extension 30' of the channel 30, the construction being such that the finger 38 will engage the outermost ball of the series, as shown in Fig. 5, and as the arm rapidly rotates clockwise in Fig. 5 this ball will be projected along the bore 32 of the barrel 31, it being understood that the arm 35 is in rapid revolution, being carried by the rapidly rotating shaft 25. Coöperating with this arm 35 is a pivoted companion arm 35× pivotally mounted at 40 to the lower part of the main arm 35, both arms having a channel as indicated at 35', 35" to receive the balls and direct them outwardly to the outer ends of the arms. The arm 35× terminates at the inner edge of the channel 30, whereas the arm 35 has the finger 38 extending across said channel. The arm 35× is pressed toward the arm 35 in any suitable manner to exert a restraining influence on the balls as they pass along the channels between the two arms and as representative of suitable means for this purpose I show a weight 41 pivotally mounted at 42 on the arm 35 and having a link or links 43 embracing the two arms with a pin 44 carried by the links and engaging a projection 45 on the arm 35×, the construction being such that the arm 35× is pressed toward the arm 35 to bear upon the balls and properly guide and control them.

As the outermost ball enters the bore 32 of the barrel the next following ball and the rest of the series will move forward and this next ball will thus enter the channel 30 and will be engaged by the finger 38 and will be propelled around the channel until the end of a complete revolution. It is brought to the mouth of the bore 32 of the barrel when the projection of this bullet will take place.

Figure 4:
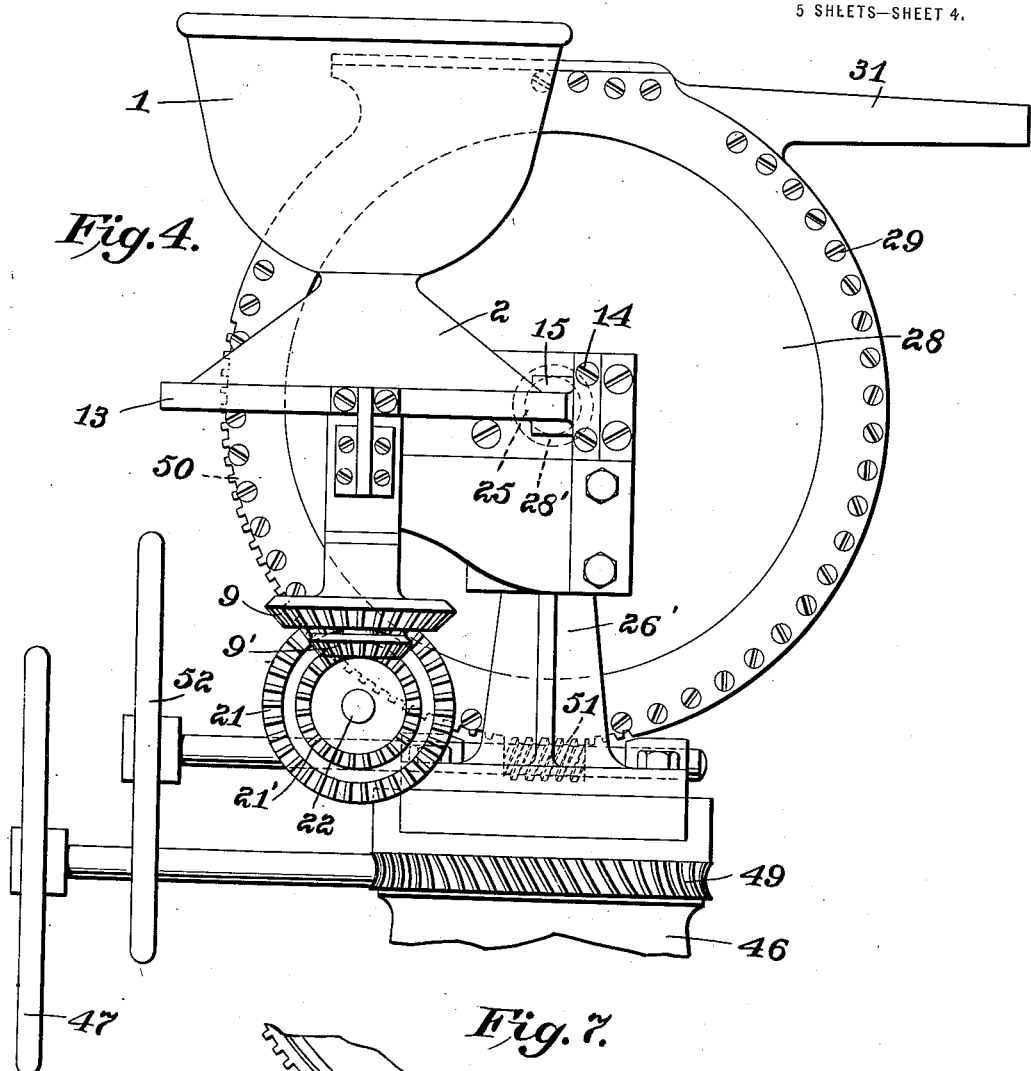
Fig. 4 is a view looking from the right-hand side of Fig. 1 but with the lower part of the frame omitted.
Figure 7:
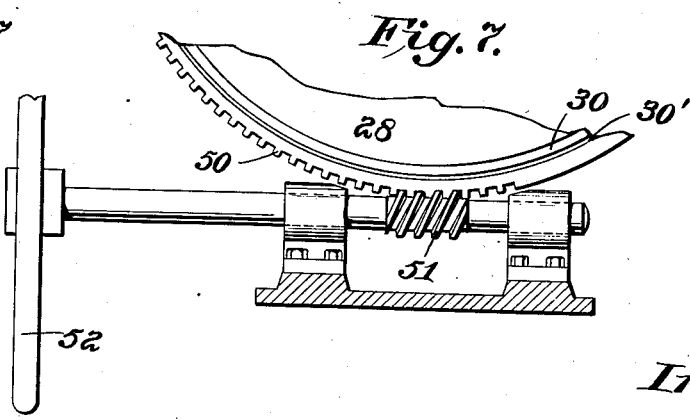
Fig. 7 is a detail view of adjusting means.

As shown in Fig. 1 the parts above described are mounted upon a standard 46 and may be turned into various angular positions by a hand wheel 47, which operates through a worm 48 and worm wheel 49 to turn the frame carrying the parts above mentioned. This will enable the operator to direct the fire in any angular position desired. In order to secure the desired elevation of the barrel the casing composed of the plates 28 is provided with peripheral teeth 50, Fig. 4, engaged by a worm 51 operated by a hand wheel 52.

What I claim is:

1. In a centrifugal gun, a rotary bullet projecting member having its axis substantially horizontal, a hopper for the bullets and a rotary feeder between the hopper and the rotary bullet projector, said feeder rotating on a substantially vertical axis at right-angles to the axis of the rotary bullet projector and feeding the bullets into the channel leading to the axis of said projector, said axial channel being tangential to the periphery of the rotary feeder, said projector having a radial channel for the bullets, a circumferential channel to receive the bullets from the radial channel and a tangential barrel communicating with the circumferential channel, substantially as described.

2. In a centrifugal gun, a rotary bullet projecting member, a hopper for the bullets and a rotary feeder between the hopper and the rotary bullet projector, said feeder rotating on an axis at right-angles to the axis of the rotary bullet projector and feeding the bullets into the channel leading to the axis of said projector, said projector having a radial channel for the bullets, a circumferential channel to receive the bullets from the radial channel and a tangential barrel communicating with the circumferential channel, said feeder comprising a rotary conical member having radial ribs at its lower edge to form radial channels between them to receive the bullets and a deflector to take the bullets from said radial channels and direct them to the axial channel leading to the projector, substantially as described.

3. In combination in a centrifugal gun, a rotary projecting device having an axial channel leading thereto, a hopper having a flared lower skirt portion, a conical feeder member rotating in said skirt portion with a space between the same and the skirt portion for the passage of the bullets, said conical feeder having radial ribs forming guide channels for the bullets and a deflector to take the bullets from said radial channels one by one and direct them into the axial channel leading to the projector, substantially as described.

4. In combination in a centrifugal gun, a rotary projecting device having an axial channel leading thereto, a hopper having a flared lower skirt portion, a conical feeder member rotating in said skirt portion with a space between the same and the skirt portion for the passage of the bullets, said conical feeder having radial ribs forming guide channels for the bullets and a deflector to take the bullets from said radial channels one by one and direct them into the axial channel leading to the projector, the said ribs being recessed on their upper edges and the deflector lying in said recesses and extending part way around the edge of the conical feeder, substantially as described.

5. In combination in a centrifugal gun, a rotary bullet projecting member rotating on a horizontal axis, a feed member rotating on a vertical axis and having radial ribs near its edge forming radial guide channels for the bullets and a deflector to take the bullets from said radial channels and direct them to the axial channel leading to the projector, substantially as described.

6. In combination a rotary projector having an axial channel leading thereto, a rotary feed member having radial channels to direct the bullets to the axial channel, a deflector for taking the bullets from the radial channels and directing them to the axial channel, a hopper and means for rotating said hopper and said feed member, said hopper and feed member being co-axially disposed, substantially as described.

7. In combination a rotary bullet projecting device, a horizontal shaft carrying the same, means for driving said shaft, said shaft having an axial channel to lead bullets to the projecting device, a rotary feed device to direct the bullets to the axial channel and mounted on a vertical shaft, a shaft parallel with the projector shaft and gearing between said projector shaft and said parallel shaft and between the parallel shaft and the vertical shaft of the feeder, substantially as described.

8. In combination a horizontal shaft, a member carried by said shaft and comprising disks or plates bolted together, a bullet projecting arm mounted between the said plates and rotating therewith, a casing comprising side plates bolted together and having a channel between them at the outer edge of the rotary plates first mentioned, the said bullet projecting arm having a finger projecting into said channel and a barrel on the casing communicating with said channel tangentially, substantially as described.

9. In combination in a centrifugal gun, a shaft, an arm extending radially from said shaft and having a channel to receive bullets, a casing within which the arm rotates having a channel extending circumferentially and a barrel having a bore communicating tangentially with said channel, said radial arm having a finger projecting into the circumferential channel, a second channel arm arranged opposite the one first mentioned, and yieldably mounted in relation thereto, the said shaft having an axial channel merging into the radial channel to direct the bullets between the said arms, substantially as described.

10. In combination in a centrifugal gun, a shaft, an arm extending radially from said shaft and having a channel to receive bullets, a casing within which the arm rotates having a channel extending circumferentially and a barrel having a bore communicating tangentially with said channel, said radial arm having a finger projecting into the circumferential channel, a second channel arm arranged opposite the one first mentioned, and yieldably mounted in relation thereto, the said shaft having an axial channel merging into the radial channel to direct the bullets between the said arms, the last mentioned arm being pivotally mounted on the arm first mentioned, substantially as described.

11. In combination in a centrifugal gun, a shaft, an arm extending radially from said shaft and having a channel to receive bullets, a casing within which the arm rotates having a channel extending circumferentially and a barrel having a bore communicating tangentially with said channel, said radial arm having a finger projecting into the circumferential channel, a second channel arm arranged opposite the one first mentioned, and yieldably mounted in relation thereto, the said shaft having an axial channel merging into the radial channel to direct the bullets between the said arms, the last mentioned arm being pivotally mounted on the arm first mentioned, the first mentioned arm having an extension beyond its bullet projecting finger and the casing having a supplemental channel to receive said extension, substantially as described.

In testimony whereof, I affix my signature.

THOMAS A. GANNOE.